(No Model.) 2 Sheets—Sheet 1.

T. MEIKLE.
COTTON SEED PLANTER.

No. 326,771. Patented Sept. 22, 1885.

WITNESSES:
J. C. Turner
F. H. Ingersoll.

INVENTOR
Thos Meikle
BY R. D. O. Smith
ATTORNEY.

(No Model.)

T. MEIKLE.

COTTON SEED PLANTER.

No. 326,771. Patented Sept. 22, 1885.

WITNESSES:
J. C. Turner
F. H. Ingersoll.

INVENTOR
Thos Meikle
BY R. D. O. Smith
ATTORNEY.

UNITED STATES PATENT OFFICE.

THOMAS MEIKLE, OF LOUISVILLE, KENTUCKY, ASSIGNOR TO THOMAS MEIKLE & COMPANY, CORPORATION, OF SAME PLACE.

COTTON-SEED PLANTER.

SPECIFICATION forming part of Letters Patent No. 326,771, dated September 22, 1885.

Application filed November 1, 1884. (No model.)

*To all whom it may concern:*

Be it known that I, THOMAS MEIKLE, of Louisville, in the county of Jefferson and State of Kentucky, have invented new and useful Improvements in Machines for Planting Cotton-Seeds; and I do hereby declare that the following is a full and accurate description of the same.

The lint adhering to the seeds of cotton causes them to mat and adhere together, and it is therefore impossible to feed them from a planting-machine by any of the devices suitable for smooth free-moving seeds, and devices of a more positive mode of action are required.

My invention consists, first, in a feed-chain having projecting fingers attached, which pass through the bottom of the seed-hopper and forcibly seize and pull out portions of the matted seeds, said chain being adjustable, so as to penetrate the hopper to such depth as may be required, and the bottom of the hopper being provided with adjustable plates, whereby the feed-opening may be enlarged or contracted; second, in a hinged bull-tongue furrow-opener, which may be turned upon its hinge to raise its point above the ground, and also in minor details, which will be fully explained hereinafter.

Figure 1:
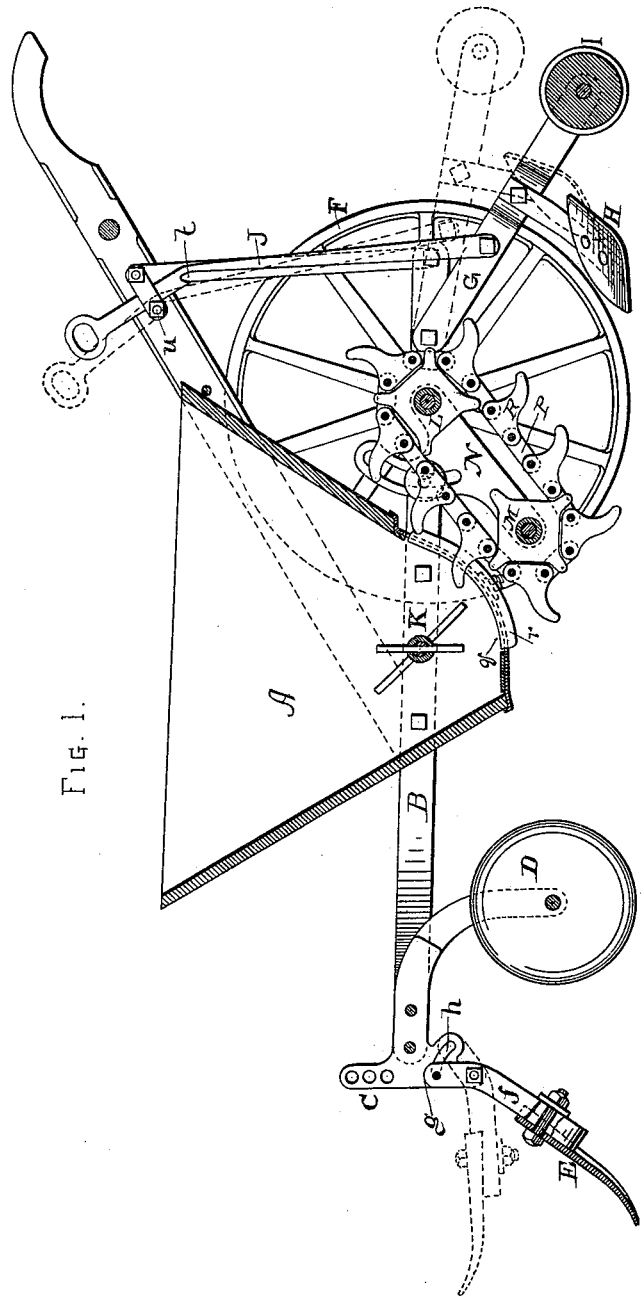
Figure 2:
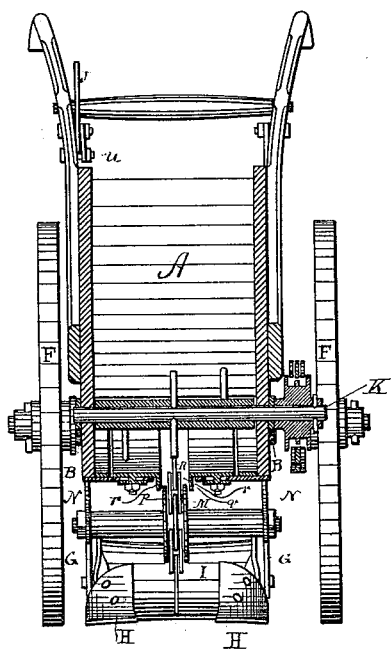
Figure 3:
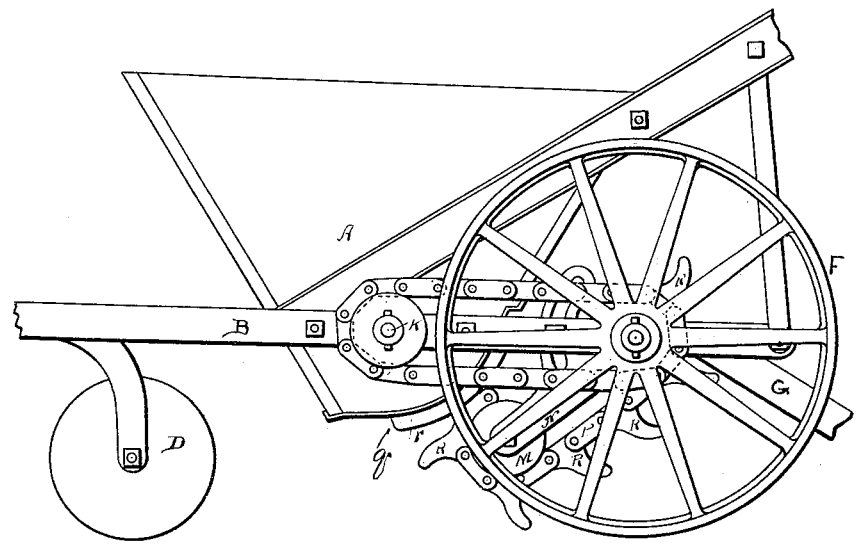

Of the drawings, Figure 1 is a longitudinal section. Fig. 2 is a transverse section of my machine, and Fig. 3 is a side elevation of the same.

A is the seed hopper, mounted upon the frame B, consisting of two side bars united at their forward ends, and at their point of union they are provided with a clevis, C, for attachment of the draft-team.

In front of the hopper a leading-wheel, D, is mounted, with its axle in boxes or bearings attached to the side bars, B B, and, if desired, said boxes may be made adjustable up or down as to said side bars, and said wheel may also be mounted to swing like a caster-wheel.

The bull-tongue furrow-opener E is attached to an arm, $f$, which, near its upper end, is hinged to a lug, $g$, rigidly secured to the drag-bars near their forward ends, and in practice said lug $g$ may advantageously be made integral with the clevis C. When the arm $f$ is turned down upon its hinge to bring the bull-tongue into working position, it is arrested by a stop of some kind when it reaches the proper point, and is not permitted to move past said stop. In practice I make a curved slot, $h$, in the lug $g$, and make the arm $f$ bifurcated at the top, so as to embrace the lug. A bolt then passes through both arm and lug for a hinge, and another bolt passes through said arm and the slot $h$ for a stop. The bull-tongue E having opened the furrow, the wheel D runs in the bottom of it and smooths it, also at the same time supporting the forward end of the machine, and, if desired, transmitting motion to the feeding devices.

At the rear the side bars, B, may be supported upon side wheels, F, or side wheels may be omitted, and the rear of the machine may be supported upon the roller or scraper, which is commonly used to press the earth down upon the seeds after covering them. Some prefer the latter for reasons of economy or other; but I prefer the mode of construction which I will now more particularly describe. At the rear are the supporting-wheels F, and the drag-bars G are hinged to the side bars, B, at or near to the axle of the supporting-wheels. The drag-bars G carry the small covering-plows H, which turn the soil inward upon the seeds in the furrow, and behind said plows H the roller I is mounted in bearings at the extremities of said drag-bars to compress the covering-soil upon the buried seeds.

The drag-bars G may be raised up to elevate the roller and covering-plows above the ground for purposes of transportation, and this is conveniently done by means of a rod, J, attached to one of said drag-bars and having a hook or notch, $t$, on one side to catch over a pin, $u$, set in the side of the handle when said parts are sufficiently elevated.

Within the hopper, near its bottom, there is an agitator composed of a transverse shaft, K, having fingers projecting radially from it. Motion is transmitted to said shaft from the driving-wheel. In the bottom of the hopper A there is a longitudinal slot, $q$, and adjustable plates $r$, whereby the width of said slot may be increased or diminished, as desired.

Behind the hopper A there are mounted upon suitable shafts two sprocket-wheels, L M, and the shaft of the latter is supported in bearings carried by adjustable plates N, whereby said sprocket M may be raised or lowered.

A chain, P, passes around and is carried by said sprocket-wheels, and said chain is armed with projecting fingers R, which project into the hopper through the slot $q$ a greater or less distance, according to the adjustment of the sprocket M, and forcibly seize and carry out through said slot a portion of the cotton-seed at each passage of said teeth.

The plates N are pivoted to the side bars at or near the bearings of the shaft for the sprocket L, so that the movements of said plates shall carry the sprocket M substantially in the arc of a circle around the axis of said sprocket L, the shaft of sprocket M being carried in bearings at the lower ends of the plates N. Said plates N are provided at their upper sides with slots $w$, concentric to the axis of sprocket L, and clamping-bolts through said slots and into the rigid frame serve to fix and hold said plates at any desired point of adjustment.

Having described my invention, I claim—

1. In a cotton-seed planter, the combination of a furrow-opener, a seed-hopper having a slot in its bottom extending up its side, and a chain carried on sprocket-wheels and armed with forwardly-inclined projecting teeth or fingers, which successively strike through the upper end of said slot into said hopper with a downward direction and out again, each finger carrying with it a portion of the cotton-seed and dropping said seed into the furrow.

2. A cotton-seed planter provided with a furrow-opener in front, a seed-hopper having a slot in its bottom and side, combined with a chain carried on sprocket-wheels and armed with forwardly-inclined fingers, which successively strike through said slot into said hopper and out again to discharge the seed forcibly, one of said sprockets being adjustable, so that the penetration and consequent feed of said fingers may be regulated at will.

3. The seed-hopper A, provided with the slot $q$, and adjustable side plates $r\ r$, to regulate the effective width of the slot $q$, combined with chain P armed with fingers R, the sprocket-wheels L M, and adjustable side plates N, in which the bearings for the sprocket M are carried, whereby the feed may be regulated as desired.

4. In a cotton-seed planter, the bull-tongue furrow-opener E, mounted on an arm, which at its upper end is hinged to the front end of the frame, so that said furrow-opener may be turned up above the ground, and provided with a stop to limit its downward movement and penetration into the ground, substantially as described.

THOS. MEIKLE.

Witnesses:
THOS. MALONE,
C. B. HALL.